(12) United States Patent
Ito

(10) Patent No.: US 12,417,563 B2
(45) Date of Patent: Sep. 16, 2025

(54) DISPLAY CONTROL DEVICE FOR AUTONOMOUS DRIVING FOR DISPLAYING A TARGET ICON, STORAGE MEDIUM FOR STORING COMPUTER PROGRAM FOR DISPLAY CONTROL FOR AUTONOMOUS DRIVING FOR DISPLAYING A TARGET ICON, AND DISPLAY CONTROL METHOD FOR AUTONOMOUS DRIVING FOR DISPLAYING A TARGET ICON

(71) Applicant: TOYOTA JIDOSHA KABUSHIKI KAISHA, Toyota (JP)

(72) Inventor: Hironori Ito, Edogawa-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 18/214,715

(22) Filed: Jun. 27, 2023

(65) Prior Publication Data

US 2024/0013451 A1    Jan. 11, 2024

(30) Foreign Application Priority Data

Jul. 5, 2022   (JP) ................................. 2022-108435

(51) Int. Cl.
*G06T 11/00* (2006.01)
*B60K 35/21* (2024.01)
(Continued)

(52) U.S. Cl.
CPC .............. *G06T 11/00* (2013.01); *B60K 35/21* (2024.01); *B60K 35/29* (2024.01); *G06V 20/588* (2022.01);
(Continued)

(58) Field of Classification Search
CPC ...... G06T 11/00; G06V 20/588; B60K 35/00; B60K 35/28; B60K 2360/33; B60K 2360/166; B60K 2360/167; B60K 35/22
See application file for complete search history.

(56) References Cited

U.S. PATENT DOCUMENTS

2015/0293354 A1    10/2015  Oishi et al.
2017/0039438 A1*   2/2017  Homma ................. G06V 20/58
(Continued)

FOREIGN PATENT DOCUMENTS

JP    2015-210644 A    11/2015
JP    2017-538995 A    12/2017
(Continued)

*Primary Examiner* — Phuc N Doan
(74) *Attorney, Agent, or Firm* — Dinsmore & Shohl LLP

(57) ABSTRACT

A display control device having a processor is configured to acquire detection information representing a closed target indicating that a lane detected around a vehicle is closed and operation information representing driver operation of an operating unit for operation of the vehicle, and to display a target icon representing the closed target on a display screen, wherein a first target icon representing the closed target is displayed on the display screen when the detection information has been acquired and the operation information has not been acquired, and a second target icon representing the closed target, which is less visible to the driver than the first target icon, is displayed on the display screen when the detection information has been acquired and the operation information has been acquired.

6 Claims, 6 Drawing Sheets

(51) Int. Cl.
*B60K 35/22* (2024.01)
*B60K 35/28* (2024.01)
*B60K 35/29* (2024.01)
*G06V 20/56* (2022.01)

(52) U.S. Cl.
CPC ............ *B60K 35/22* (2024.01); *B60K 35/28* (2024.01); *B60K 2360/166* (2024.01); *B60K 2360/167* (2024.01); *B60K 2360/33* (2024.01)

(56) References Cited

U.S. PATENT DOCUMENTS

| | | | |
|---|---|---|---|
| 2017/0243483 | A1 | 8/2017 | Kaneshige et al. |
| 2018/0247138 | A1 | 8/2018 | Kang |
| 2020/0400455 | A1* | 12/2020 | Wakayanagi .......... B60K 35/81 |
| 2022/0130296 | A1 | 4/2022 | Kamiya et al. |

FOREIGN PATENT DOCUMENTS

| | | | |
|---|---|---|---|
| JP | 2018-142309 | A | 9/2018 |
| JP | 2018-200626 | A | 12/2018 |
| JP | 2021-036226 | A | 3/2021 |
| JP | 2021049968 | A * | 4/2021 |
| WO | 2013/136447 | A1 | 9/2013 |

* cited by examiner

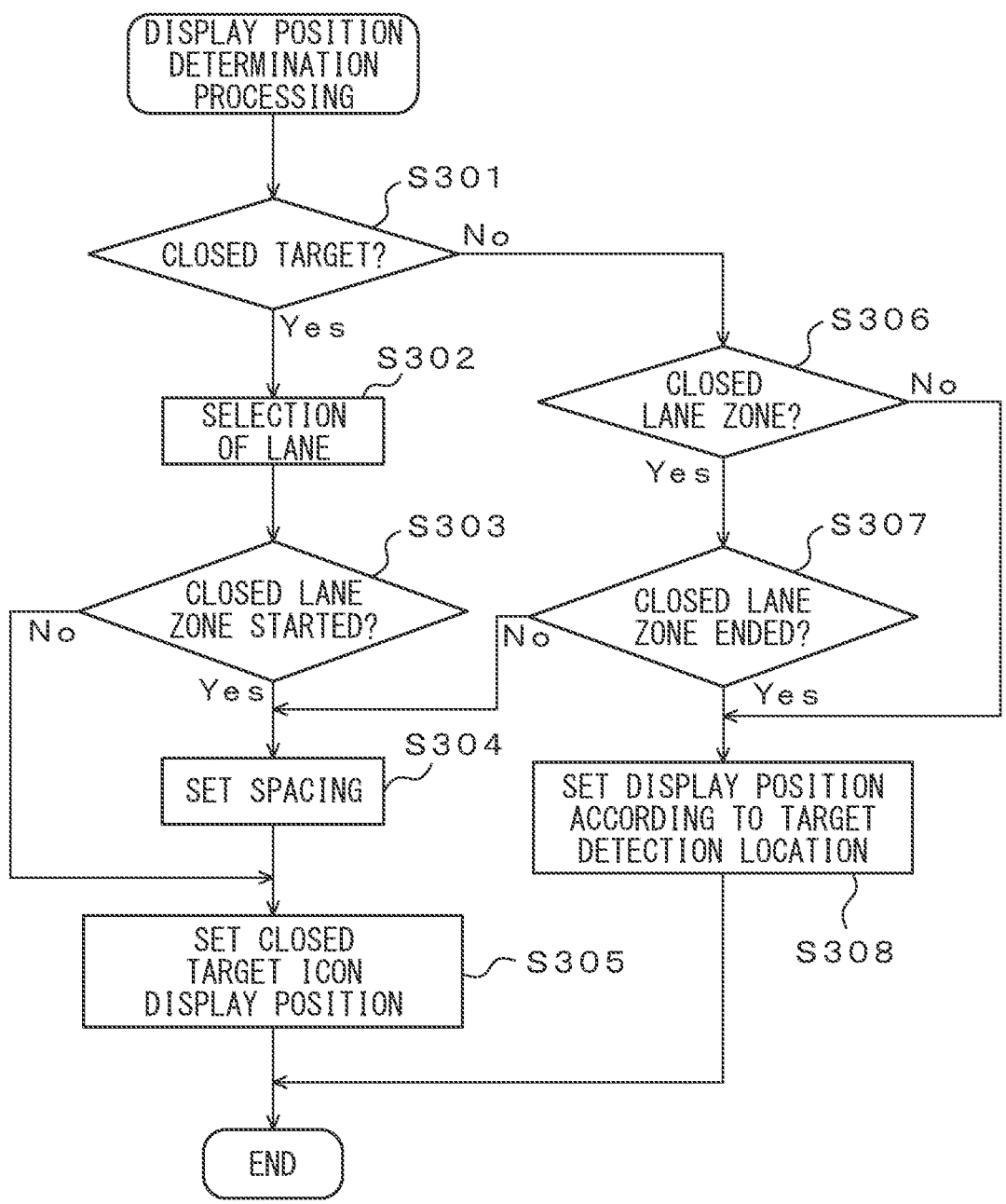

DISPLAY CONTROL DEVICE FOR AUTONOMOUS DRIVING FOR DISPLAYING A TARGET ICON, STORAGE MEDIUM FOR STORING COMPUTER PROGRAM FOR DISPLAY CONTROL FOR AUTONOMOUS DRIVING FOR DISPLAYING A TARGET ICON, AND DISPLAY CONTROL METHOD FOR AUTONOMOUS DRIVING FOR DISPLAYING A TARGET ICON

CROSS-REFERENCE TO RELATED APPLICATION

This application is a national phase of Japanese Patent Application No. 2022-108435 filed on Jul. 5, 2022, the entire contents of which are herein incorporated by reference.

FIELD

The present disclosure relates to a display control device, a storage medium storing a computer program for display control, and a display control method.

BACKGROUND

It is known technology to use a sensor mounted in a vehicle to detect other vehicles, displaying targets representing the other vehicles in relation to the vehicle on a display device in the vehicle, and notifying the driver of information regarding targets around the vehicle (see Japanese Unexamined Patent Publication No. 2018-142309, for example).

With such a display device, the driver can confirm the surrounding environment of the vehicle while the targets displayed on the display device are recognized by an automatic control system of the vehicle.

SUMMARY

When a closed target such as a pylon is detected indicating that the lane is closed for construction, for example, the display device displays a target icon representing the pylon or other closed target within the lane.

When a target icon representing the closed target has been displayed on the display device, the driver judges that the closed target has been recognized by the automatic control system of the vehicle. Since the closed target has been recognized by the automatic control system of the vehicle, the driver may potentially judge that it is not permitted to move the vehicle in the direction of the closed lane.

Depending on the conditions, however, it may be necessary to move the vehicle in the direction of the closed lane, and it may not be expedient to give the driver the impression that moving the vehicle in the direction of the closed lane is not permitted.

If the visibility of the target icon representing the closed target displayed on the display device is reduced, the driver will be less likely to assume that moving the vehicle in the direction of the closed lane is not permitted.

It is therefore an object of the present disclosure to provide a display control device that displays a target icon representing a closed target depending on conditions, so that the driver is not given a false impression regarding closed lanes.

One embodiment of the present disclosure provides a display control device. The display control device has an acquisition unit that acquires detection information representing a closed target indicating that a lane detected around a vehicle is closed and operation information representing driver operation of an operating unit for operation of the vehicle, and a display control unit that displays a target icon representing the closed target on a display screen, in which the display control unit displays a first target icon representing the closed target on the display screen when the detection information has been acquired through the acquisition unit and the operation information has not been acquired through the acquisition unit, and the display control unit displays a second target icon representing the closed target on the display screen, which is less visible to the driver than the first target icon, when the detection information has been acquired through the acquisition unit and the operation information has been acquired through the acquisition unit.

In some embodiments of this display control device, the lower visibility of the second target icon for the driver compared to the first target icon may include lower visual accentuation of the second target icon for the driver compared to the first target icon, or higher transparency of the second target icon compared to the first target icon.

In some embodiments of this display control device, the display control device may have a positioning unit that sets a display position where the target icon representing the closed target is to be displayed on the display screen based on a detected location of the target, and when a lane-closed zone has started in which multiple closed targets are situated on a single lane, the positioning unit sets the display positions of multiple first target icons or second target icons representing the closed targets so that they are represented at predetermined spacings along the lane marking line indicating the lane that is closed off, shown in the display screen, without being based on the detected locations of the closed targets.

In some embodiments of this display control device, the operation information in the display control device may also represent operation of the accelerator pedal, brake pedal or steering wheel by the driver.

According to another embodiment, a computer-readable, non-transitory storage medium storing a computer program for display control is provided. The computer program for display control causes a processor execute a process and the process includes acquiring detection information representing a closed target indicating that a lane detected around a vehicle is closed and operation information representing driver operation of an operating unit for operation of the vehicle, and displaying a target icon representing the closed target on a display screen, in which a first target icon representing the closed target is displayed on the display screen when the detection information has been acquired and the operation information has not been acquired, and a second target icon representing the closed target, which is less visible to the driver than the first target icon, is displayed on the display screen when the detection information has been acquired and the operation information has been acquired.

According to yet another embodiment, a display control method carried out by a display control device is provided. The display control method includes acquiring detection information representing a closed target indicating that a lane detected around a vehicle is closed and operation information representing driver operation of an operating unit for operation of the vehicle, and displaying a target icon representing the closed target on a display screen, in which a first target icon representing the closed target is displayed on the display screen when the detection information has been acquired and the operation information has not been acquired, and a second target icon representing the closed target, which is less visible to the driver than the first target icon, is displayed on the display screen when the detection information has been acquired and the operation information has been acquired.

The display control device of the disclosure can display a target icon representing a closed target depending on conditions, so that the driver is not given a false impression regarding closed lanes.

The object and aspects of the present disclosure will be realized and attained by the elements and combinations particularly pointed out in the claims. It is to be understood that both the foregoing general description and the following detailed description are exemplary and explanatory and are not restrictive of the present disclosure, as claimed.

BRIEF DESCRIPTION OF DRAWINGS

FIG. 6 is an example of an operation flow chart for display position determination processing according to a modified example.

DESCRIPTION OF EMBODIMENTS

Figure 1:
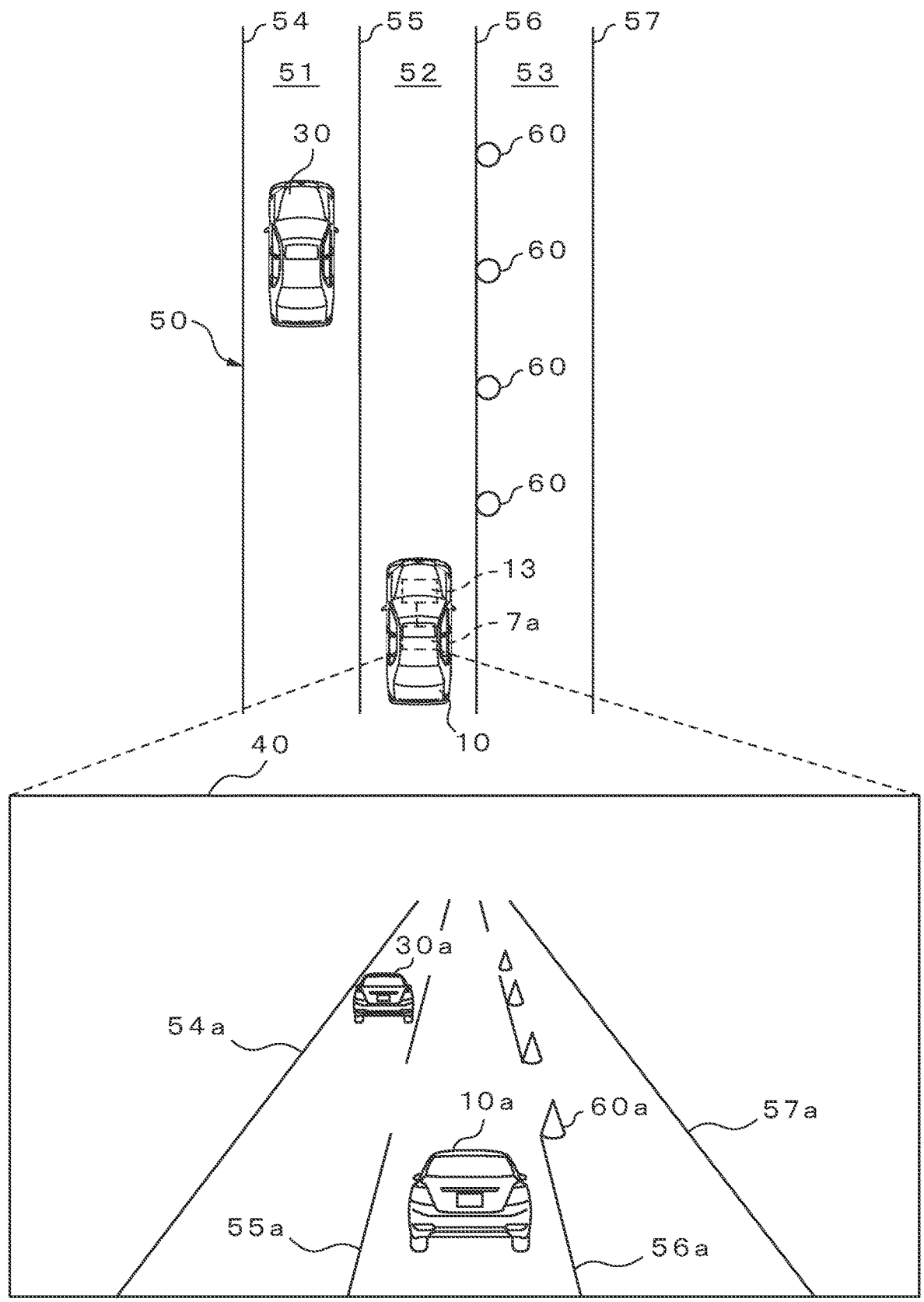
FIG. 1 is a diagram illustrating operation of a display image generating device according to the embodiment in overview (1).
Figure 2:
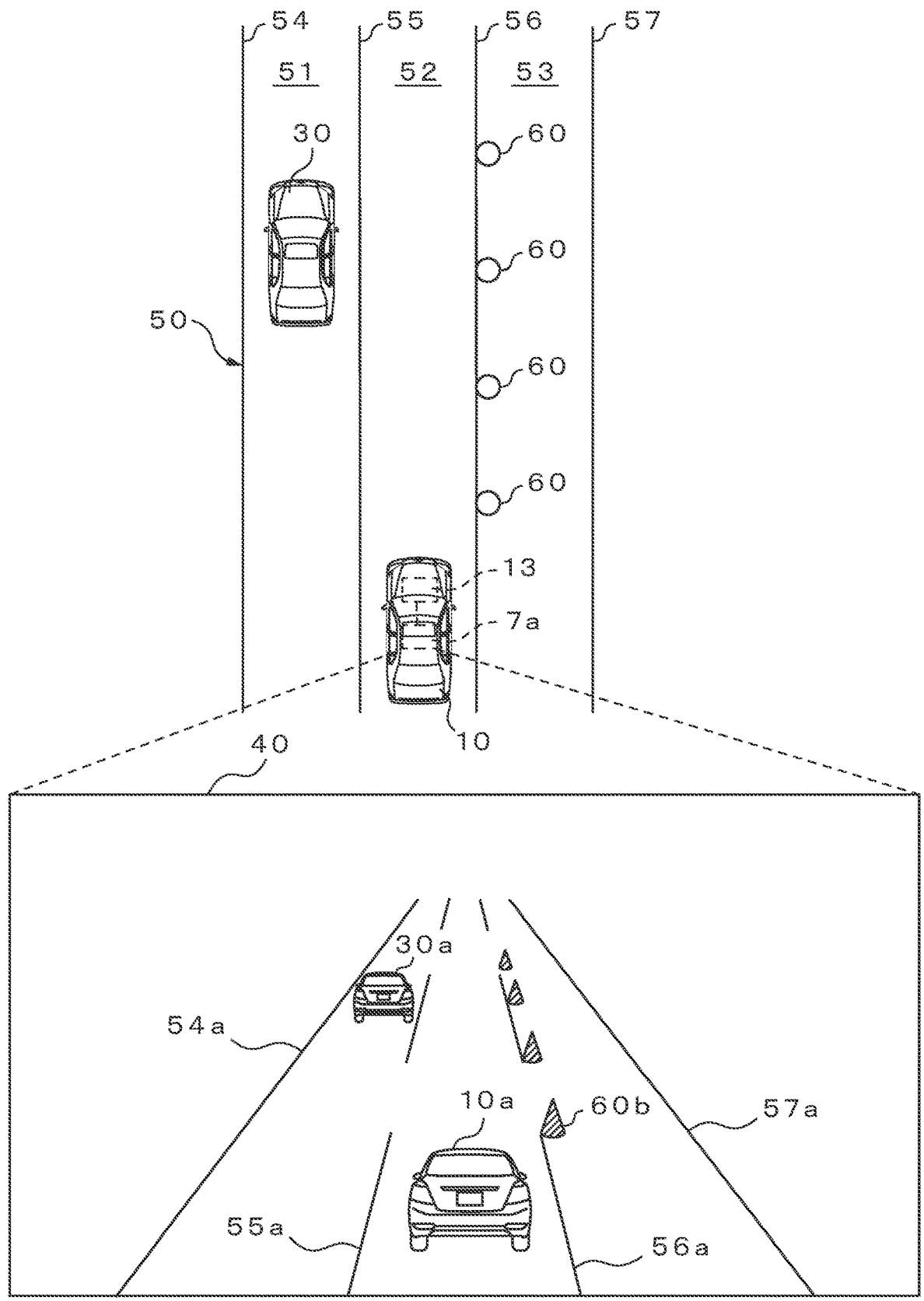
FIG. 2 is a diagram illustrating operation of a display image generating device according to the embodiment in overview (2).

FIG. 1 and FIG. 2 are diagrams illustrating operation of a display image generating device 13 according to the embodiment in overview. The display image generating device 13 is an example of a display control device. Operation relating to display image generating processing by the display image generating device 13 disclosed herein will now be described in overview with reference to FIG. 1.

As shown in FIG. 1 and FIG. 2, a vehicle 10 travels on one lane 52 of a road 50 having lanes 51, 52 and 53. The lane 51 is demarcated by a lane marking line 54 and a lane marking line (lane boundary line) 55, and the lane 52 is demarcated by the lane marking line 55 and a lane marking line 56 (lane boundary line). The lane 53 is demarcated by the lane marking line 56 and lane marking line 57.

The vehicle 10 has an automatic control system (not shown) that drives the vehicle 10. Driving of the vehicle 10 can be mainly carried out by the vehicle 10 itself. Driving of the vehicle 10 can also be mainly carried out by the driver who operates units (not shown) such as the steering wheel, brake pedal and accelerator pedal. The vehicle 10 can also support driving by the driver when driving of the vehicle 10 is mainly by the driver. The vehicle 10 may be an autonomous vehicle.

Even when driving of the vehicle 10 is mainly carried out by the vehicle 10 itself, the driver can intervene in operation of the vehicle 10 by operation of operating units such as the steering wheel, brake pedal or accelerator pedal.

The vehicle 10 has a display device 7a and a display image generating device 13. The display image generating device 13 displays on the display device 7a targets surrounding the vehicle 10 that have been detected by a sensor (not shown) mounted in the vehicle 10, so that the driver can confirm that information to be used to control the vehicle 10 is correct.

In the examples shown in FIG. 1 and FIG. 2, the sensor (not shown) mounted on the vehicle 10 detects another vehicle 30 and closed targets 60 indicating that the lane 53 is closed. The vehicle 30 is traveling on the lane 51. The multiple closed targets 60 are situated on the right side of the lane marking line 56 and indicate that the lane 53 is closed. Examples of closed targets 60 include pylons and cone bars.

Since the closed targets 60 indicating that the lane 53 is closed are detected and the driver is not operating an operating unit (not shown) such as a steering wheel, brake pedal or accelerator pedal, the display image generating device 13 selects a first closed target icon for representation of the closed targets as the icon to be displayed on the display device 7a. When the closed targets 60 are pylons, the first closed target icon used may be an amber or red icon.

The display image generating device 13 generates a display image 40 representing the lane marking lines 54 to 57, the vehicle 10, the vehicle 30 and the closed targets 60, and displays it on the display device 7a, as shown in FIG. 1.

Displayed in the display image 40 are marking lines 54a, 55a, 56a, 57a representing the lane marking lines 54, 55, 56, 57, a vehicle icon 10a representing the vehicle 10, a vehicle icon 30a representing the vehicle 30 and first closed target icons 60a.

The vehicle icon 10a is shown between the marking line 55a and the marking line 56a, at the lower part of the display image 40. The vehicle icon 30a is shown between the marking line 54a and the marking line 55a, at the upper part of the display image 40.

The multiple first closed target icons 60a indicate closure of the lane 53 adjacent to the lane 52 in which the vehicle 10 is traveling. When the first closed target icons 60a have been displayed on the display device 7a, the driver judges that a closed target 60 has been recognized by the vehicle 10. Since the closed targets 60 have been recognized by the vehicle 10, the driver may potentially judge that it is not permitted to move the vehicle 10 in the direction of the closed lane. The vehicle 10 is under no special control with respect to the closed lane 53 other than to avoid driving operation that would move the vehicle 10 toward the closed lane 53.

However, when the closed targets 60 indicating that the lane 53 is closed have been detected and the driver has operated an operating unit (not shown) such as a steering wheel, brake pedal or accelerator pedal, the display image generating device 13 selects a second closed target icon for representation of the closed targets, which is less visible to the driver than the first closed target icon, as the icon to be displayed on the display device 7a. When the closed targets 60 are pylons, the second closed target icon used may be a gray icon.

The display image generating device 13 generates a display image 40 representing the lane marking lines 54 to 57, the vehicle 10, the vehicle 30 and the closed targets 60, and displays it on the display device 7a, as shown in FIG. 2.

Displayed in the display image 40 of the display device 7a are marking lines 54a, 55a, 56a, 57a representing the lane marking lines 54, 55, 56, 57, a vehicle icon 10a representing the vehicle 10, a vehicle icon 30a representing the vehicle 30 and a second closed target icon 60b.

If the visibility of the closed target icon representing the closed target displayed on the display device 7a is reduced, the driver will be less likely to assume that moving the vehicle 10 in the direction of the closed lane is not permitted.

As explained above, when a closed target 60 is detected indicating that the lane 53 is closed and operation of an operating unit by the driver has been detected, the display image generating device 13 displays the second target icon 60b representing the closed target 60, which is less visible to the driver. When the driver is operating the vehicle 10, the display image generating device 13 can tell the driver that the closed target 60 is of low importance weight in terms of information to be used for driving the vehicle 10. This can help avoid the display image generating device 13 from giving the driver a false impression regarding the closed lane 53.

FIG. 2 is a general schematic drawing of a vehicle 10 in which a display system 1 of the embodiment is mounted. The vehicle 10 has a camera 2, LiDAR sensor 3, torque sensor 4, pedal sensor 5, positioning information receiver 6, user interface (UI) 7, map information storage device 11, object detector 12 and display image generating device 13. The vehicle 10 may also have a millimeter wave radar, as a distance sensor (not shown) for measurement of the distance of the vehicle 10 to surrounding objects. The display system 1 has at least the UI 7 and the display image generating device 13.

The camera 2, LiDAR sensor 3, torque sensor 4, pedal sensor 5, positioning information receiver 6, UI 7, map information storage device 11, object detector 12 and display image generating device 13 are connected in a communicable manner through an in-vehicle network 14 that conforms to controller area network standards.

The camera 2 is an example of an imaging unit provided in the vehicle 10. The camera 2 is mounted inside the vehicle 10 and directed toward the front of the vehicle 10. The front camera 2 takes a camera image in which the environment of a predetermined region ahead of the vehicle 10 is shown, at a camera image photograph time set with a predetermined cycle, for example. The camera image can show the road in the predetermined region ahead of the vehicle 10, and road features such as surface lane marking lines on the road. The camera image also represents other vehicles and pylons indicating lane closures. The camera 2 has a 2D detector composed of an array of photoelectric conversion elements with visible light sensitivity, such as a CCD or C-MOS, and an imaging optical system that forms an image of the photographed region on the 2D detector. The camera image is an example of surrounding environment information representing the environment surrounding the vehicle.

Each time a camera image is taken, the camera 2 outputs the camera image and the camera image photograph time through the in-vehicle network 14 to the object detector 12, etc. At the object detector 12, the camera image is used for processing to detect other objects surrounding the vehicle 10.

The LiDAR sensor 3 is mounted on the outer side of the vehicle 10, for example, being directed toward the front of the vehicle 10. The LiDAR sensor 3 emits a scanning laser toward the front of the vehicle 10, at a reflected wave information acquisition time set with a predetermined cycle, and receives a reflected wave that has been reflected from a reflector. The time required for the reflected wave to return contains information for the distance between the vehicle 10 and other objects located in the direction in which the laser has been emitted. The LiDAR sensor 3 outputs the reflected wave information that includes the laser emission direction and the time required for the reflected wave to return, together with the reflected wave information acquisition time at which the laser was emitted, through the in-vehicle network 14 to the object detector 12. At the object detector 12, the reflected wave information is used for processing to detect other objects surrounding the vehicle 10. For this embodiment, the reflected wave information acquisition time is in synchronization with the camera image photograph time. The reflected wave information is an example of surrounding environment information representing the environment surrounding the vehicle.

The torque sensor 4 detects force causing the rotating shaft of the steering wheel to rotate, which has been produced by operation of the steering wheel (not shown) by the driver, and outputs a torque detection signal indicating the force of rotation to the display image generating device 13 via the in-vehicle network 14. The torque sensor 4 does not generate a torque detection signal when there is no operation of the steering wheel by the driver. The torque sensor 4 is an example of a detector that detects driver operation of the operating units that operate the vehicle 10. The torque detection signal is an example of the operation information representing driver operation of operating units.

The pedal sensor 5 detects operation of the brake pedal or accelerator pedal (not shown) by the driver and outputs a brake pedal detection signal or accelerator pedal detection signal indicating the degree of operation, to the display image generating device 13 via the in-vehicle network 14. The pedal sensor 5 does not generate a detection signal when there is no operation of the brake pedal or accelerator pedal by the driver. The pedal sensor 5 is an example of a detector that detects driver operation of the operating units that operate the vehicle 10. The brake pedal detection signal and accelerator pedal detection signal are examples of the operation information representing driver operation of operating units.

The positioning information receiver 6 outputs positioning information that represents the current location of the vehicle 10. The positioning information receiver 6 may be a GNSS receiver, for example. The positioning information receiver 6 outputs positioning information and the positioning information acquisition time at which the positioning information has been acquired, to the map information storage device 11, etc. each time positioning information is acquired at a predetermined receiving cycle.

The UI 7 is controlled by the display image generating device 13 and notifies the driver of information to be used for control of the vehicle 10. Information to be used for control of the vehicle 10 may include target information such as other vehicles or pylons indicating lane closure, in the vicinity of the vehicle 10. The UI 7 has a display device 7a such as a liquid crystal display or touch panel, for display of the information. The UI 7 may also have an acoustic output device (not shown) to notify the driver of the information. Incidentally, the UI 7 may also notify the driver of information other than information to be used for control of the vehicle 10 (such as information relating to travel of the vehicle 10 on a driving route, for example).

The map information storage device 11 stores wide-area map information for a relatively wide area (an area of 10 to 30 km$^2$, for example) that includes the current location of the vehicle 10. In some embodiments, the map information may have high precision map information including three-dimensional information for the road surface, the speed limit for the road, the curvature of the road, and information for the types and locations of structures and road features such as road lane marking lines.

The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 6, the map information storage device 11 refers to the stored wide-area map information and outputs map information for a relatively narrow area including the current location represented by the positioning information (for example, an area of 100 m² to 10 km²), through the in-vehicle network 14 to the object detector 12 and display image generating device 13, etc.

The object detector 12 detects targets around the vehicle 10, and their types, based on the camera image. Targets include road features, moving objects such as pedestrians or other vehicles moving around the vehicle 10, and pylons indicating lane closures. The object detector 12 has a classifier that identifies targets represented in images when the camera images are input, for example. The classifier may use a deep neural network (DNN) that has been trained to detect targets represented in input images, for example. The object detector 12 may also use a classifier other than a DNN. For example, the classifier used by the object detector 12 may be a support vector machine (SVM) that has been trained to output a confidence factor for representation of targets to be detected in the window, with the input being a feature descriptor (such as Histogram of Oriented Gradients, HOG, for example) calculated from a window set in the image. Alternatively, the object detector 12 may detect a target region by template matching between the image and a template in which a target to be detected is represented.

The object detector 12 may also detect other targets in the front area around the vehicle 10 based on reflected wave information. The object detector 12 may also determine the orientation of a target with respect to the vehicle 10 based on the location of the target in the camera image, and may determine the distance between the target and the vehicle 10, based on the orientation and on the reflected wave information output by the LiDAR sensor 3. The object detector 12 estimates the location of the target represented in a vehicle coordinate system with the vehicle 10 as the origin, based on the current location of the vehicle 10, and the distance to the target from the vehicle 10 and its orientation, for example. The location of the target may be the center of gravity of the region representing the target, for example. Alternatively, the location of the target may be determined with an offset in the traveling direction of the vehicle 10 or the direction perpendicular to the traveling direction, with respect to the location of the center of gravity of the region representing the target. The object detector 12 outputs target detection information which includes information representing the types of targets that were detected (such as pedestrians, other vehicles or pylons), and information indicating their locations, to the display image generating device 13. The target detection information is an example of detection information that represents a closed target indicating closure of a lane, that has been detected around the vehicle 10.

The object detector 12 may also detect targets based on the reflected wave information, without using a camera image. In this case, the object detector 12 has a classifier that inputs reflected wave information, for example, and identifies targets represented in the reflected wave information. The object detector 12 thus estimates the types of targets and locations of other objects based on the reflected wave information.

The display image generating device 13 carries out display control processing, icon selection processing and position determination processing. The display image generating device 13 has a communication interface (IF) 21, a memory 22 and a processor 23 for this purpose. The communication interface 21, memory 22 and processor 23 are connected via signal wires 24. The communication IF 21 has an interface circuit to connect the display image generating device 13 with the in-vehicle network 14. The communication IF 21 is an example of an acquisition unit.

The memory 22 is an example of a memory unit, and it has a volatile semiconductor memory and a non-volatile semiconductor memory, for example. The memory 22 stores an application computer program and various data to be used for information processing carried out by the processor 23.

All or some of the functions of the display image generating device 13 are functional modules driven by a computer program operating on the processor 23, for example. The processor 23 has a display control unit 231, an icon selecting unit 232 and a positioning unit 233. Alternatively, the functional module of the processor 23 may be a specialized electronic circuit in the processor 23. The processor 23 has one or more CPUs (Central Processing Units) and their peripheral circuits. The processor 23 may also have other computing circuits such as a logical operation unit, numerical calculation unit or graphic processing unit.

Figure 3:
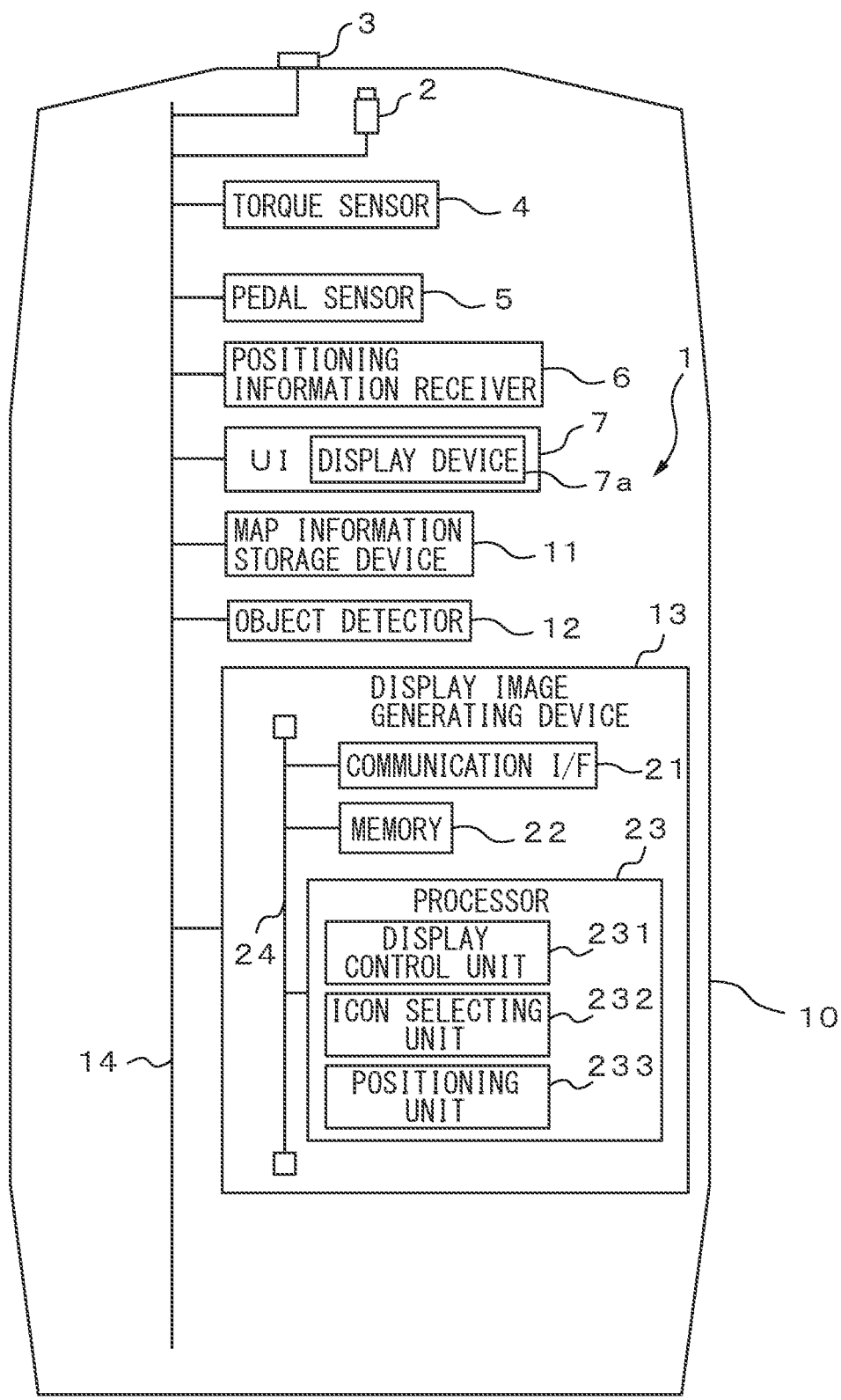
FIG. 3 is a general schematic drawing of a vehicle in which a display system of the embodiment is mounted.

The map information storage device 11, object detector 12 and display image generating device 13 may be electronic control units (ECU), for example. In FIG. 3, the map information storage device 11, object detector 12 and display image generating device 13 were explained as separate devices, but all or some of them may be constructed in a single device.

Figure 4:
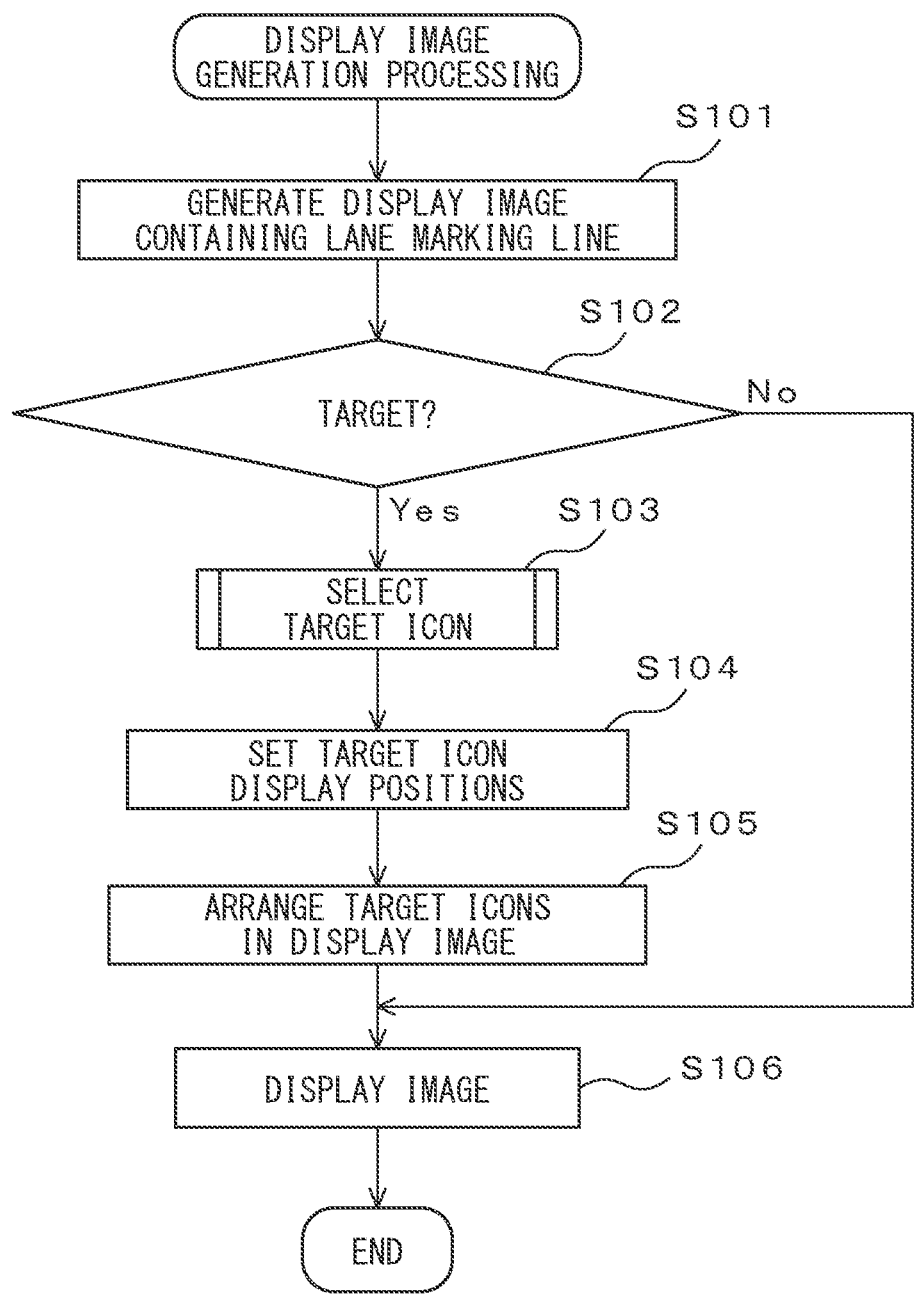
FIG. 4 is an example of an operation flow chart for display image generation processing by the display image generating device of the embodiment.

FIG. 4 is an example of an operation flow chart for display image generation processing by the display image generating device 13 of the embodiment. Display image generation processing by the display image generating device 13 will now be described in detail with reference to FIG. 4. The display image generating device 13 carries out display image generation processing according to the operation flow chart shown in FIG. 4, at a display image generating time having a predetermined cycle. The cycle at which the display image generation processing is carried out may be determined by the relationship between the camera image photograph time and the reflected wave information acquisition time cycle.

First, the display control unit 231 generates a display image containing lane marking lines included in the camera image taken by the camera 2 (step S101). The display control unit 231 acquires the locations of the lane marking lines in the region represented by the camera image based on the map information, at the location of the vehicle 10 at the camera image photograph time. For the map information, the region to be represented in the camera image can be calculated based on internal parameters, etc., including the installed location information such as the optical axis direction and mounting position of the camera 2, and the focal length and viewing angle of the imaging optical system.

The display control unit 231 represents the coordinates for the lane marking lines in the region represented in the camera image, which are represented on the world coordinate system, on a vehicle coordinate system with the vehicle 10 as the origin. The vehicle coordinate system has the midpoint between left and right rear wheels of the vehicle 10 and above the ground as the origin, with the traveling direction of the vehicle 10 as the zv axis, the direction perpendicular to the zv axis and parallel to the ground as the xv axis, and the vertical direction as the yv axis. This coordinate transformation allows rotational and translational representation of the coordinates.

The display control unit 231 generates a projection image with the lane marking lines that were represented in the vehicle coordinate system projected onto a predetermined projection plane with perpendicular zv axes, and generates a display image containing the lane marking lines. The predetermined projection plane may be situated near the driving seat of the vehicle 10.

The display control unit 231 may also generate a display image containing lane marking lines based on the lane marking lines identified from the camera image.

The display control unit 231 may place the vehicle icon representing the vehicle 10 in the lane where the vehicle 10 is located in the display image. The display control unit 231 sets the lane where the vehicle 10 is located based on the current location of the vehicle 10 and map information. The display control unit 231 may place the vehicle icon representing the vehicle 10 in the lane where the vehicle 10 is located, at the lower end of the display image.

The positioning unit 233 then determines whether or not a target other than a lane marking line has been detected, based on the target detection information (step S102). The positioning unit 233 determines that a target has been detected if target detection information representing a target other than a lane marking line has been input. Conversely, the positioning unit 233 determines that a target has not been detected if target detection information representing a target other than a lane marking line has not been input.

When a target has been detected (step S102—Yes), the icon selecting unit 232 selects a target icon to represent the target (step S103). Icon selection processing by which the target icon is selected will now be described.

The positioning unit 233 then sets a display position where the target icon is to be displayed in the display device 7a (step S104). The positioning unit 233 projects the detected location of the target represented in the vehicle coordinate system onto the projection plane, and sets the display position for the target icon in the display image.

The display control unit 231 then places the target icon at a display position in the display image (step S105). In some embodiments, the size of the target icon may change depending on the distance between the current location of the vehicle 10 and the target. In this case, the size of the target icon is set so that the target icon is larger with a shorter distance between the current location of the vehicle 10 and the target.

When target detection information representing multiple targets has been input into the display image generating device 13, the processing of step S103 to step S105 above is carried out for each target.

The display control unit 231 then displays the display image on the display device 7a (step S106), and the series of processing steps is complete.

When a target other than a lane marking line has not been detected (step S102—No), the display control unit 231 displays the display image including lane marking lines on the display device 7a (step S106), and the series of processing steps is complete.

Figure 5:
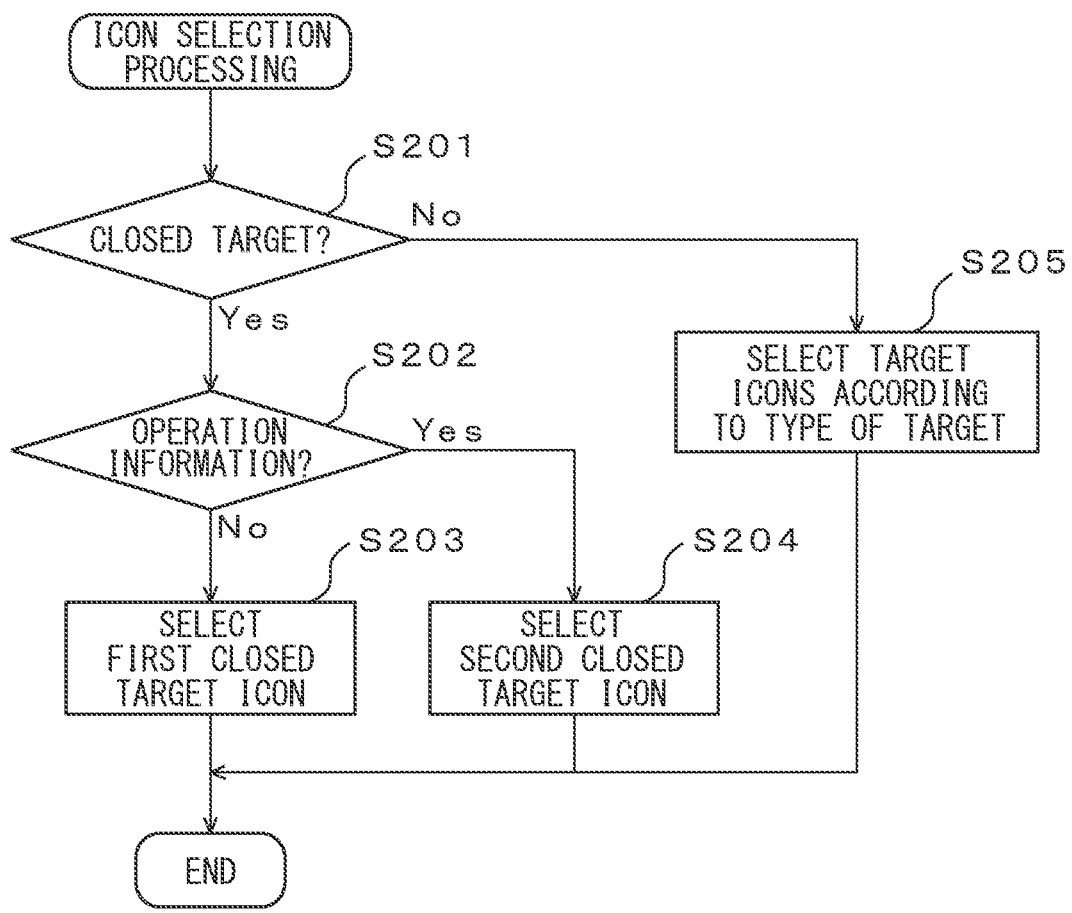
FIG. 5 is an example of an operation flow chart for icon selection processing by the display image generating device of the embodiment.

FIG. 5 is an example of an operation flow chart for icon selection processing by the display image generating device 13 of the embodiment. Icon selection processing by the display image generating device 13 will now be described in detail with reference to FIG. 5.

First, the icon selecting unit 232 determines whether or not the target is a closed target indicating closure of a lane, based on the type of target in the target detection information (step S201). Examples of closed targets include pylons and cone bars.

When the target is a closed target indicating closure of a lane (step S201—Yes), the icon selecting unit 232 determines whether or not the operation information indicating driver operation of the operating unit for operation of the vehicle 10 has been acquired through the communication IF 21 (step S202). The Operating units include the steering wheel, brake pedal and accelerator pedal (not shown). Driver operation includes operation of the steering wheel, accelerator pedal or brake pedal.

When a torque detection signal, brake pedal detection signal and/or accelerator pedal detection signal has been acquired, the icon selecting unit 232 determines that the operation information has been acquired.

When a torque detection signal, brake pedal detection signal and/or accelerator pedal detection signal has not been acquired, on the other hand, the icon selecting unit 232 determines that the operation information has not been acquired.

When the operation information has not been acquired (step S202—No), the icon selecting unit 232 selects a first closed target icon representing a closed target as the icon to display on the display device 7a (step S203), and the series of processing steps is complete. When the closed targets are pylons, the first closed target icon used may be an amber or red icon. The target icons representing each target including closed targets are prestored in the memory 22. The target icons are selected according to the type of target. For example, normal vehicles and large vehicles such as trucks are generated as target icons representing different types of vehicles.

When the operation information has been input, on the other hand (step S202—Yes), the icon selecting unit 232 selects a second closed target icon representing a closed target, which is less visible to the driver than the first closed target icon, as the icon to be displayed on the display device 7a (step S204), and the series of processing steps is complete.

The lower visibility of the second closed target icon for the driver compared to the first closed target icon may include lower visual accentuation of the second closed target icon for the driver compared to the first closed target icon, or higher transparency of the second closed target icon compared to the first closed target icon. The lower visibility of the second closed target icon for the driver compared to the first closed target icon may also include a smaller size of the second closed target icon compared to the first closed target icon.

The icon selecting unit 232 may also select the second closed target icon to have the same shape as the first closed target icon and a color with lower visual accentuation for the driver than the first closed target icon. When each of the first closed targets is an amber or red icon, for example, the second closed target icons used may be gray icons.

The icon selecting unit 232 may also select the second closed target icon to have the same shape as the first closed target icon and higher transparency than the first closed target icon. In some embodiments, for example, a second closed target icon may be selected that has transparency of 50% or greater, or 70% or greater compared to the first closed target icon. The icon selecting unit 232 may also select a transparent closed target icon so that the second closed target icon is effectively not displayed on the display device 7a.

When a target is not a closed target representing closure of a lane (step S201—No), the icon selecting unit 232 selects a target icon corresponding to the type of target from among target icons stored in the memory 22 (step S205), and the series of processing steps is complete.

Processing by which a display image containing a closed target is generated by the display image generating device 13 will now be explained with reference to FIG. 1 and FIG. 2.

In the examples shown in FIG. 1 and FIG. 2, another vehicle 30 and closed targets 60 indicating closure of a lane 53 have been detected. The vehicle 30 is traveling on the lane 51. The multiple closed targets 60 are situated on the right side of the lane marking line 56 and indicate that the lane 53 is closed. Examples of closed targets 60 include pylons and cone bars.

Closed targets 60 indicating closure of the lane 53 have been detected and no operation information indicating operation of the operating units such as the steering wheel, brake pedal or accelerator pedal by the driver has been acquired. The display image generating device 13 therefore selects a first closed target icon indicating a closed target as the icon to be displayed on the display device 7a. When the closed targets 60 are pylons, the first closed target icon used may be an amber or red icon.

In some embodiments, the color for the first closed target icon may be close to the color of the closed targets 60 shown in the field of view of the driver, from the viewpoint of allowing confirmation that there is no difference between the information represented in the display device 7a and the environment surrounding the vehicle shown in the field of view of the driver.

The display image generating device 13 generates a display image 40 representing the lane marking lines 54 to 57, the vehicle 10, the vehicle 30 and the closed targets 60, and displays it on the display device 7a, as shown in FIG. 1.

Displayed in the display image 40 of the display device 7a are marking lines 54a, 55a, 56a, 57a representing the lane marking lines 54, 55, 56, 57, a vehicle icon 10a representing the vehicle 10, a vehicle icon 30a representing the vehicle 30 and first closed target icons 60a.

The multiple first closed target icons 60a indicate closure of the lane 53 adjacent to the lane 52 in which the vehicle 10 is traveling. The driver can confirm that there is no difference between the actual field of view and the first closed target icons 60a displayed in the display device 7a, which indicate that the lane 53 is closed.

When the first closed target icons 60a have been displayed on the display device 7a, the driver judges that the closed targets 60 have been recognized by the vehicle 10. Since the closed targets 60 have been recognized by the vehicle 10, the driver may potentially judge that it is not permitted to move the vehicle 10 in the direction of the closed lane. The vehicle 10 is under no special control with respect to the closed lane 53 other than to avoid driving operation that would move the vehicle 10 into the closed lane 53.

In the example shown in FIG. 2, on the other hand, closed targets 60 indicating closure of the lane 53 have been detected and the operation information indicating operation of the operating units such as the steering wheel, brake pedal or accelerator pedal by the driver has been acquired. The display image generating device 13 may select the second closed target icon to be one having the same shape as the first closed target icon and indicating a closed target, which is less visible to the driver than the first closed target icon, as the icon to be displayed on the display device 7a. When the closed targets 60 are pylons, the second closed target icon used may be a gray icon. The second closed target icon may also be one with high transparency.

It is thus possible to ensure that the second closed target icons representing the closed targets 60 are less visible to the driver when the driver is operating an operating unit, thereby helping to prevent the driver from thinking that the closed targets 60 are being used for control of the vehicle 10.

During the assessment in step S202, the direction of steering is not considered since it is not known whether the driver is actually attempting to move the vehicle 10 toward the opposite side from the closed lane even if operation of the steering wheel tends to steer the vehicle 10 toward the opposite side from the closed lane.

Since the purpose of display of the second closed target icons on the display device 7a is to indicate to the driver that the closed targets are of low importance weight in terms of information to be used for driving the vehicle 10, operation of the brake pedal by the driver is also included in the operation information.

If the first closed target icons 60a are displayed on the display device 7a while the driver is operating an operating unit, however, the driver may think that the closed target icons are not of low importance weight in terms of information to be used for driving the vehicle 10.

For example, even when driving of the vehicle 10 is mainly or partially by the vehicle 10 itself, the driver can move the vehicle 10 toward the closed lane 53 by operating the steering wheel.

If the first closed target icons 60a are displayed on the display device 7a while the driver is operating the operating unit, the driver may think that such operation is not permitted for the vehicle 10.

As explained above, when a closed target indicating a lane closure is detected and operation of an operating unit by the driver has been detected, the display image generating device of the embodiment displays a second target icon representing the closed target, which is less visible to the driver. When the driver is operating the vehicle, the display image generating device can tell the driver that the closed target is of low importance weight in terms of information to be used for driving the vehicle. This can help avoid the display image generating device from giving the driver a false impression regarding the closed lane.

A modified example of the display image generating device of this embodiment will now be described with reference to FIG. 6. FIG. 6 is an example of an operation flow chart for display position determination processing according to a modified example of the display image generating device.

The detected location of a closed target by the camera 2 or LiDAR sensor 3 mounted in the vehicle 10 will be unstable in some cases. This is because of the low detection accuracy of closed targets such as pylons and cone bars.

It is sometimes the case that when a display position where a closed target icon indicating a closed target is to be displayed on the display device 7a is set based on the detected location of the closed target, the display position of the closed target icon indicating the closed target on the display device 7a has shifted. Shifting of the display position where the closed target icon is displayed on the display device 7a may result in lower visibility of the vehicle 10 surroundings for the driver.

For this modified example, the display position determination processing by which the display position of the target icon is set in step S104 of FIG. 4 is carried out as shown in FIG. 6, thus stabilizing the display position where the closed target icon representing the closed target is displayed on the display device 7a, to improve the visibility of the vehicle 10 surroundings for the driver.

First, the positioning unit 233 determines whether or not the target is a closed target indicating closure of a lane, based on the type of target in the target detection information (step S301).

If the target is a closed target indicating closure of a lane (step S301—Yes), the positioning unit 233 selects the lane in which the closed target is located (step S302). The positioning unit 233 refers to map information to select a lane containing the location where the detected location of the closed target is projected onto the plane of the road. The positioning unit 233 also selects the lane marking line adjacent to the location where the detected location of the closed target is projected onto the plane of the road, among the pair of lane marking lines delineating the selected lane, as the adjacent lane marking line. The closed targets are arranged along the adjacent lane marking line to indicate that the selected lane is closed.

Next, the positioning unit 233 determines whether or not a closed lane zone has started where a lane is closed off by the closed targets (step S303). If at least a predetermined reference number of the closed targets have been detected in a single lane, then the positioning unit 233 determines that a closed lane zone has started in the lane. If at least a predetermined reference number of closed targets have not been detected in a single lane, on the other hand, the positioning unit 233 determines that a closed lane zone has not started in the lane.

Thus, when target detection information representing multiple targets has been input into the display image generating device 13, the processing of step S303 above is carried out for each target. This allows the positioning unit 233 to count the number of closed targets that have been detected in a single lane.

When a closed lane zone has started (step S303—Yes), the positioning unit 233 sets predetermined spacings for placement of the display positions for the closed target icons (indicating closed targets) in the display image, along the lane marking line indicating the lane that is closed off (step S304). The closed target icons are the first closed target icons or second closed target icons. Fixed values (such as 10 m to 20 m) may also be used as the predetermined spacings.

The positioning unit 233 may also set predetermined spacings based on the speed of the vehicle 10. Alternatively, the positioning unit 233 may set the predetermined spacings based on the speed limit for the road on which the vehicle 10 is traveling. The positioning unit 233 may also set the predetermined spacings based on the curvature of the road on which the vehicle 10 is traveling. In some embodiments, the spacings may be shorter with greater road curvature. The positioning unit 233 may also set the predetermined spacings based on the projection angle at which the placement positions of the closed targets represented in the vehicle coordinate system are projected onto the projection plane.

The positioning unit 233 then sets the display positions for the closed target icons in the display image (step S305), and the series of processing steps is complete. The positioning unit 233 places the closed target icons at the predetermined spacings along the lane marking line adjacent to the closed lane. The positioning unit 233 also projects the placement positions for the closed target icons represented in the vehicle coordinate system onto the projection plane, and sets the display positions for the target icons in the display image. The closed target icons used may be the icons selected in step S103.

Multiple closed target icons with display positions set in this manner are displayed in the display image at the predetermined spacings along the lane marking line indicating the lane that is closed off. Since the display positions of the closed target icons are not related to the actual detected locations of the closed targets, the display positions where the closed target icons are displayed on the display device 7a can be stabilized to increase the visibility of the vehicle 10 surroundings for the driver.

When a closed lane zone has not started (step S303—No), on the other hand, the positioning unit 233 sets the display positions for the closed target icons in the display image (step S305), and the series of processing steps is complete. The positioning unit 233 projects the detected locations of the closed targets represented in the vehicle coordinate system onto the projection plane, and sets the display positions for the closed target icons in the display image.

If a target is not a closed target indicating closure of a lane (step S301—No), the positioning unit 233 determines whether or not the closed lane zone is in a started state (step S306). A "started state" of a closed lane zone is a state in which the closed lane zone was determined to have started in step S303, and the closed lane zone has not been determined to have ended in step S307.

If a closed lane zone is in a started state (step S306—Yes), the positioning unit 233 determines whether or not the closed lane zone has ended (step S307). The positioning unit 233 determines that the closed lane zone has ended if the closed targets have not been detected during a predetermined time or a predetermined travel distance in the closed lane. On the other hand, if the time or travel distance during which the closed targets have not been detected in the closed lane has not reached the respective predetermined time or predetermined travel distance, then the positioning unit 233 determines that the closed lane zone has not ended.

When the closed lane zone has ended (step S307—Yes), the positioning unit 233 sets the display positions for the closed target icons in the display image (step S308), and the series of processing steps is complete. The positioning unit 233 projects the detected location of the target represented in the vehicle coordinate system onto the projection plane, and sets the display position for the target icon in the display image.

When the closed lane zone has not ended (step S307—No), on the other hand, processing proceeds to step S304. In this case, the multiple closed target icons are displayed at predetermined spacings along the lane marking line indicating the lane that is closed off.

When the closed lane zone is not in a started state (step S306—No), on the other hand, processing proceeds to step S308. That the closed lane zone is not in a started state means that the closed lane zone has not been determined to have started in step S303.

The display control device, computer program for display control and display control method according to the embodiment described above may incorporate appropriate modifications that are still within the gist of the disclosure. Moreover, the technical scope of the disclosure is not limited to these embodiments, and includes the present disclosure and its equivalents as laid out in the Claims.

For example, the method of generating the display image to be displayed on the display screen is not limited to the method described above. Any publicly known technique may be used to generate a display image containing lane marking lines and vehicle icons, for example.

Moreover, for the embodiment described above, the closed target icons were selected by an icon selecting unit from among multiple target icons stored in the memory, but the closed target icons may instead be generated by the display image generating device.

For the closed lane zones in the modified example described above, the lane marking lines representing the closed lane and other vehicles in the closed lane do not necessarily need to be displayed in the display image. In such cases, a lane marking line representing a closed lane and another vehicle may be displayed if the other vehicle has been detected moving from the closed lane zone to an adjacent traveling lane.

The invention claimed is:

1. A display control device comprising:
a processor configured to:
acquire detection information representing a closed target indicating that a lane detected around a vehicle is closed and operation information representing driver operation of an operating unit for operation of the vehicle, and
display a target icon representing the closed target on a display screen,
wherein a first target icon representing the closed target is displayed on the display screen when the detection information has been acquired and the operation information has not been acquired, and a second target icon representing the closed target, which is less visible to the driver than the first target icon, is displayed on the display screen when the detection information has been acquired and the operation information has been acquired, and
wherein the operation information includes that the driver is operating a steering wheel to move the vehicle toward an opposite side from the closed lane.

2. The display control device according to claim 1, wherein the lower visibility of the second target icon for the driver compared to the first target icon includes lower visual accentuation of the second target icon for the driver compared to the first target icon, or higher transparency of the second target icon compared to the first target icon.

3. The display control device according to claim 1, wherein the processor is further configured to
set a display position where the target icon representing the closed target is to be displayed on the display screen based on a detected location of the closed target, and
when a lane-closed zone has started in which multiple closed targets are situated on a single lane, set the display positions of multiple first target icons or second target icons representing the closed targets so that they are represented at predetermined spacings along the lane marking line indicating the lane that is closed off, shown in the display screen, without being based on the detected locations of the closed targets.

4. A computer-readable, non-transitory storage medium storing a computer program for display control, which causes a processor execute a process, and the process comprising:
acquiring detection information representing a closed target indicating that a lane detected around a vehicle is closed and operation information representing driver operation of an operating unit for operation of the vehicle; and
displaying a target icon representing the closed target on a display screen,
wherein a first target icon representing the closed target is displayed on the display screen when the detection information has been acquired and the operation information has not been acquired, and a second target icon representing the closed target, which is less visible to the driver than the first target icon, is displayed on the display screen when the detection information has been acquired and the operation information has been acquired, and
wherein the operation information includes that the driver is operating a steering wheel to move the vehicle toward an opposite side from the closed lane.

5. A display control method carried out by a display control device and, the method comprising:
acquiring detection information representing a closed target indicating that a lane detected around a vehicle is closed and operation information representing driver operation of an operating unit for operation of the vehicle; and
displaying a target icon representing the closed target on a display screen,
wherein a first target icon representing the closed target is displayed on the display screen when the detection information has been acquired and the operation information has not been acquired, and a second target icon representing the closed target, which is less visible to the driver than the first target icon, is displayed on the display screen when the detection information has been acquired and the operation information has been acquired, and
wherein the operation information includes that the driver is operating a steering wheel to move the vehicle toward an opposite side from the closed lane.

6. A display control device comprising:
a processor configured to:
acquire detection information representing a closed target indicating that a lane detected around a vehicle is closed and operation information representing driver operation of an operating unit for operation of the vehicle, and
display a target icon representing the closed target on a display screen,
wherein a first target icon representing the closed target is displayed on the display screen when the detection information has been acquired and the operation information has not been acquired, and a second target icon representing the closed target, which is less visible to the driver than the first target icon, is displayed on the display screen when the detection information has been acquired and the operation information has been acquired, and
wherein the processor is further configured to:
set a display position where the target icon representing the closed target is to be displayed on the display screen based on a detected location of the closed target, and
when a lane-closed zone has started in which multiple closed targets are situated on a single lane, set the display positions of multiple first target icons or second target icons representing the closed targets so that they are represented at predetermined spacings along the lane marking line indicating the lane that is closed off, shown in the display screen, without being based on the detected locations of the closed targets.

* * * * *